B. C. BALL & L. E. YOUNIE.
FRICTION CLUTCH MECHANISM.
APPLICATION FILED OCT. 21, 1914.
1,172,923.
Patented Feb. 22, 1916.
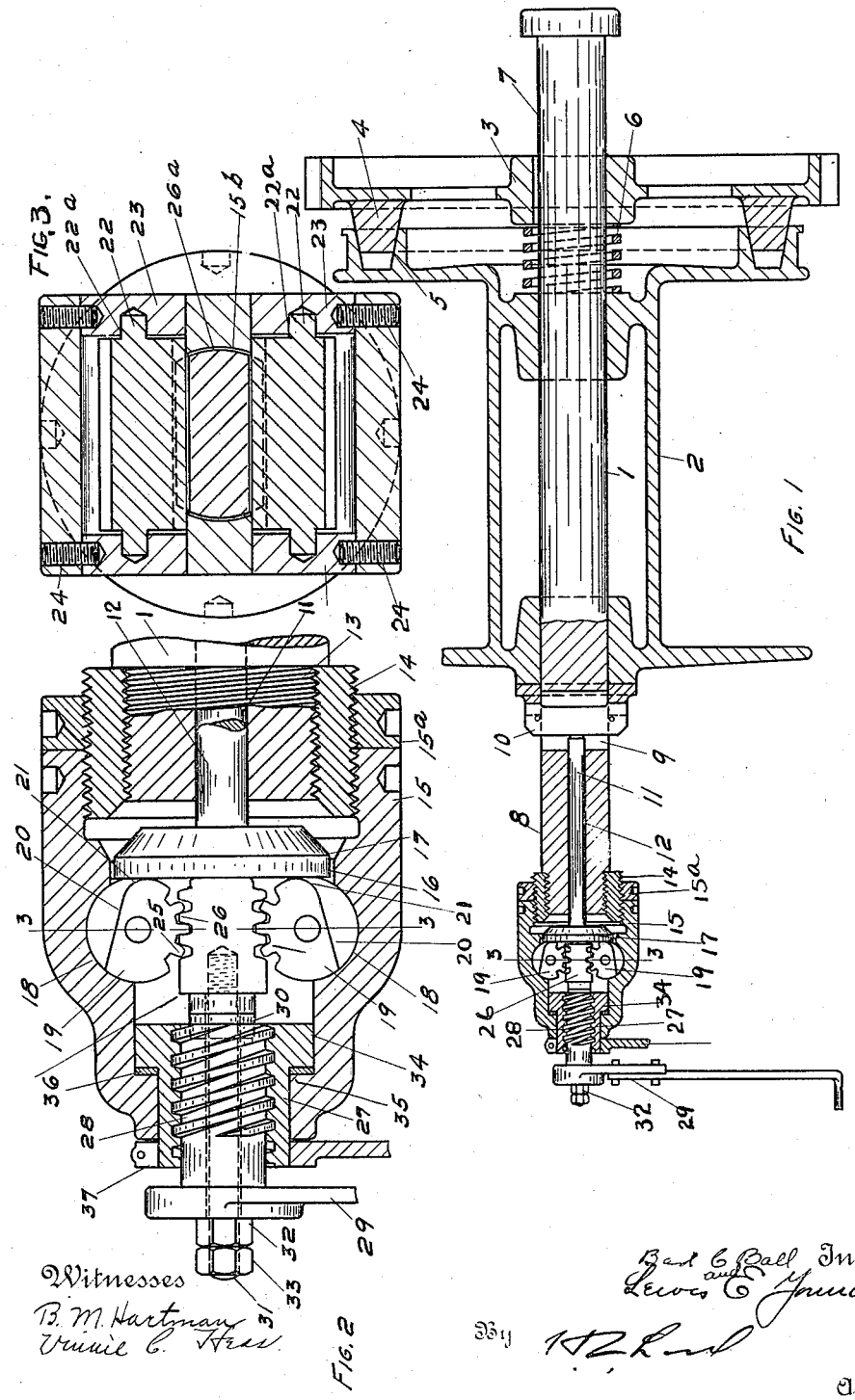

UNITED STATES PATENT OFFICE.

BERT C. BALL AND LEWIS E. YOUNIE, OF PORTLAND, OREGON.

FRICTION-CLUTCH MECHANISM.

1,172,923. Specification of Letters Patent. Patented Feb. 22, 1916.

Application filed October 21, 1914. Serial No. 867,776.

*To all whom it may concern:*

Be it known that we, BERT C. BALL and LEWIS E. YOUNIE, citizens of the United States, residing at Portland, in the county of Multnomah and State of Oregon, have invented new and useful Improvements in Friction-Clutch Mechanisms, of which the following is a specification.

This invention relates to friction clutch mechanisms and consists in certain improvements in the construction thereof, as will be hereinafter fully described and pointed out in the claims.

More particularly the invention relates to thrust devices for friction clutches, particularly such friction clutches as are used in connection with the drums of logging or hoisting engines, such clutch actuating mechanisms being ordinarily termed friction devices.

The invention is illustrated in the accompanying drawing as follows:—

Figure 1 shows a central section through the drum and attached friction device. Fig. 2 a similar section through the friction device, the view being somewhat enlarged. Fig. 3 a section on the line 3—3 in Figs. 1 and 2.

"1" marks the drum shaft, "2" the drum, "3" the gear wheel fixed on the shaft for driving the drum, "4" the friction cone, "5" the friction surface operating with the drum, "6" the spring for backing off the friction surface when the friction device is released, "7" one of the bearing surfaces on the drum shaft, "8" the opposite bearing surface, "9" the key-slot through the shaft, "10" the thrust key arranged in the slot, "9", against the drum, "11" the thrust pin arranged in an axial perforation in the shaft ordinarily extending through that portion of the shaft within the bearing surface "8". These parts are of usual construction.

The shaft "1" has a screw thread "13" at one end. A bushing "14" is screwed on the screw thread "13" and against the shoulder formed at the inner end of the screw thread "13". The bushing "14" is set upon the screw thread "13" so as to practically become a permanent part of the shaft. The friction device head "15" is screwed on to the bushing "14" and locked in adjustment thereon by a jam nut "15ᵃ". The head has an enlarged opening "16" at its inner end with the axis coincident with the axis of the shaft "1". The thrust block shown in the form of a disk "17" is arranged in this opening and against the thrust pin "12." The head also has the transverse bores or cylindical openings "18" in which are the rocking thrust pins "19." The thrust pins "19" have a portion "20" cut away so that when they are rocked so as to bring the cut-away portion next the block "17", the block may move outwardly so as to release the clutch. The pins have the rolling thrust surfaces "21," which when the pins "19" are rocked, move outwardly on the block "17", bringing the larger cross dimension or portion of the pin having its full dimension between the bearing surface formed by the cylindrical opening "18" and the block "17." When in this position, with the parts properly adjusted, the clutch will be firmly set. The pins "19" have the pintles "22" at their ends and these are arranged in sockets "22ᵃ" in plugs "23—23". These plugs form a closure for the ends of the cylindrical openings "18" and are secured therein by the screws "24."

The pins "19" have the gear segments "25" opposite the cut-away portions "20." These gear segments mesh an interposed rack "26", the rack having preferably cylindrical side surfaces "26ᵃ" and being guided in the cylindrical opening "15ᵇ" in the head, this opening being concentric with the opening "16" but somewhat smaller. It will be readily observed that as the rack "26" is moved inwardly or outwardly, the pins "19" are rocked so as to bring the cut-away portion "20" next to the block "17", in which position the clutch is released or to interpose the larger dimension of the pin so as to set the clutch. It will be observed that with the block "17" in its outward or rearward position that with the initial rocking movement of the pins "19", the forward movement of the block and consequently of the thrust pins and drum will be practically co-extensive with the forward movement of the rack "26", but that as the pin "19" continues its movement, the forward movement of the block "17" is slower relatively to that of the rack "26" as it approaches its set position. It will be observed that if the movement of the pins is continued until the full cylindical surfaces were interposed between the block and the bearing surface of the wall of the cylindrical opening "18", the forward movement of the block will cease entirely. By this arrangement a rapid movement is initially given to the thrust devices so as to take up the slack, but in the final setting movement the thrust delivered to the block "17" and thrust pins is very much greater than the thrust of the rack "26". In this way a very rapid movement may be accomplished so as to give plenty of slack or freedom to the clutch and at the same time very powerful thrust is delivered in the final set position.

We prefer the following mechanism for operating the rack "26:" A fixed screw member "27" has the active screw member "28" extending through it. A handle or lever "29" is fixed on the end of the screw, by which the active screw member may be manually operated so as to exert its thrust against the rack "26" or to release the same. Hardened washers "30" are preferably provided between the active screw member "28" and the rack "26". In order that the rack "26" may be retracted with the active screw member, a pin "31" is extended through the active screw member and secured to the rack "26." A nut "32" is arranged outside of the active screw member so as to form a shoulder against which the screw member acts. The nut "32" is locked in adjustment by the jam nut "33". The fixed screw member has an external shoulder "34" opposing an internal shoulder "35" in the head "15". A washer "36" is interposed between these shoulders. The fixed screw member "27" is locked against turning by means of a lever "37", which is secured to the outer end of the fixed screw member "27" and any convenient stationary part, ordinarily a part of the frame of the engine. These parts, that is, the opposing shoulders between the head and the screw member and the screw members, themselves, may be reversed. Preferably, however, they are arranged as shown and the thrust of the fixed screw member is preferably carried from the shaft "1" so as to relieve the bearings of this shaft from end thrust. It will be noted in the structure as shown all the parts subjected to thrust are carried by the shaft and there is no tendency to end thrust whatever on said bearings.

In the operation of the device, assuming the parts to be in released position, the operator seizes the handle "29" turning up the screw member, "28." This forces the rack "26" inwardly and rocks the pins "19," thus moving the thrust block "17" against the thrust pins. The thrust pins and intermediate parts communicate the movement to the cone surface so as to set the clutch. In the initial part of this movement, the thrust block "17" is moved substantially at the same rate as the rack "26", but as the movement progresses the surfaces interposed between the thrust block and the wall of the cylindrical opening "18" vary and approach more nearly a true cylindrical surface so that while the initial movement is rapid in taking up the slack the final movement is much slower than the rack "26", with consequent increase in power. The final position brings the full cylindrical portion of the pin into the line of thrust, so the thrust has no tendency to turn the pins. The pressure on the rack from the screw member may, therefore, be relieved without releasing the clutch. This is important in that when this is done wear and friction from relatively rotating parts is obviated, except during the setting operation. To release the clutch all that is necessary is to reverse the screw. This retracts the rack and rocks the pins, bringing the cut-away portion "20" or smaller cross dimension of the pins between the bearing surface of the opening "18" and the thrust block. The thrust block can then move outwardly, the spring "6" moving the friction surfaces out of contact.

It will be observed that the structure as described is one that may be easily manufactured. The whole head may be machined from the rear end, having the opening for the interior thread, the opening "16" and the opening "15b" forming a guide for the rack and a socket for the head "34." The opening may be continued in a smaller size for the fixed screw member. The bearings and mountings for the pins "19" are made by boring the head transversely.

It will be observed that by loosening the jam nut "15a", the head "15" may be screwed inwardly or outwardly on the bushing "14", thus changing the relative position of the head and the shaft "1". In this way the distance between the thrust block "17" and the bearing surfaces on the opening "18" may be adjusted so that when the pins "19" have their largest dimension interposed between the thrust block and the bearing, the thrust on the clutch will be sufficient to set it under its normal condition of load. In this way all wear of parts may be readily taken up and the parts readily adjusted for service. While we prefer to adjust the distance between the block and the head by an adjustment of the head in the broader phases of the invention, we do not wish to be limited to this construction.

What we claim as new is:—

1. In a friction clutch mechanism, the combination of a shaft; a clutch on the shaft; and a friction device for actuating the clutch comprising a thrust block; a head having a thrust surface opposed to the block; a pin rocking on a transverse axis and interposed between the block and the thrust surface, said pin having varying cross dimensions, the block assuming a position to set the clutch with a larger cross dimension of the pin interposed between the block and the surface; and means operating on the pin to force the block through the rocking of the pin to set position.

2. In a friction clutch mechanism, the combination of a shaft; a clutch on the shaft; and a friction device for actuating the clutch comprising a thrust block; a head having a thrust surface opposed to the block; a pin rocking on a transverse axis and interposed between the block and the thrust surface, said pin having varying cross dimensions, the block assuming a position to set the clutch with a larger cross dimension of the pin interposed between the block and the surface and in position to release the clutch with a smaller dimension of the pin interposed between the block and the surface; and means operating on the pin to force the block through the rocking of the pin to set position, said pin varying in dimension to force the block a greater distance with a given movement of the means in the early stages of the setting action than in the later stages of the setting action.

3. In a friction clutch mechanism, the combination of a shaft; a friction clutch on the shaft; and a friction device for actuating the clutch comprising a thrust block; a connection between the block and the clutch; a head having a thrust bearing opposed to the block; a rocking thrust pin in said bearing and between the block and the bearing, said pin having varying cross dimensions, the block assuming a position to set the clutch with a larger cross dimension of the pin interposed between the block and the bearing and in position to release the clutch with a smaller dimension of the pin interposed between the block and the bearing; and means operating on the pin to force the block through the rocking of the pin to set position.

4. In a friction clutch mechanism, the combination of a shaft; a friction clutch on the shaft; and a friction device for actuating the clutch comprising a thrust block; a connection between the block and the clutch; a head having a thrust bearing opposed to the block; a rocking thrust pin in said bearing and between the block and the bearing, said pin having varying cross dimensions, the block assuming a position to set the clutch with a larger cross dimension of the pin interposed between the block and the bearing and in position to release the clutch with a smaller dimension of the pin interposed between the block and the bearing; and means operating on the pin to force the block through the rocking of the pin to set position and operating on the pin to release the clutch.

5. In a friction clutch mechanism, the combination of a shaft; a friction clutch on the shaft; and a friction device for actuating the clutch comprising a thrust block; a connection between the block and the clutch; a head having a thrust bearing opposed to the block; a rocking thrust pin in said bearing and between the block and the bearing, said pin having varying cross dimensions, the block assuming a position to set the clutch with a larger cross dimension of the pin interposed between the block and the bearing and in position to release the clutch with a smaller dimension of the pin interposed between the block and the bearing; and means operating on the pin to force the block through the rocking of the pin to set position, said pin varying in dimension to force the block a greater distance with a given movement of the means in the early stages of its setting action than in the later stages of the setting action.

6. In a friction clutch mechanism, the combination of a shaft; a clutch on the shaft; and a friction device for actuating the clutch comprising a thrust block; a head having a transverse cylindrical bore; a cylindrical pin having one side cut away to vary the cross dimension of the pin, said pin being arranged in said cross bore and being opposed to said block; and means for throwing the cut-away portion into and out of register with the block.

7. In a friction clutch mechanism, the combination of a shaft; a clutch on the shaft; and a friction device for actuating the clutch comprising a thrust block; a head having a transverse cylindrical bore; a cylindrical pin having one side cut away to vary the cross dimension of the pin, said pin being arranged in said cross bore and being opposed to said block; and means for throwing the cut-away portion into and out of register with the block to release and set the clutch, said pin having its cut-away surface varying radially to the cylindrical bore to force the block a greater distance with a given movement of the pin in the early stages of the rocking movement than in the later stages.

8. In a friction clutch mechanism, the combination of a shaft; a clutch on the shaft; and a friction device for actuating the clutch comprising a thrust block; a head having a thrust surface opposed to the block; a pin rocking on a transverse axis and interposed between the block and the thrust surface on the head, said pin having varying cross dimensions which are adapted to be thrown into and out of position and interposed between the surface on the head and the block to set and release the clutch; a gear segment on the pin; and a rack operating on the gear segment to rock the pin.

9. In a friction clutch mechanism, the combination of a shaft; a clutch on the shaft; and a friction device for actuating the clutch comprising a thrust block; a connection between the block and the clutch; a head having a transverse cylindrical bore; a cylindrical pin having one side cut away forming varying cross dimensions arranged in the cylindrical bore, said pin being provided with a gear segment; and a rack operating on the gear segment and throwing said cut-away portions into and out of register with the block to release and set the clutch.

10. In a friction clutch mechanism, the combination of a shaft; a clutch on the shaft; and a friction device for actuating the clutch comprising a thrust block; a head having thrust surfaces opposed to the block; rocking pins, one each side of the axis, said pins rocking on axes transverse to the axis of the head, said pins being interposed between the block and the thrust surfaces and having varying cross dimensions; and means operating on opposing sides of the pins for rocking the pins to actuate the clutch.

11. In a friction clutch mechanism, the combination of a shaft; a clutch on the shaft; and a friction device for actuating the clutch comprising a thrust block; a head having thrust surfaces opposed to the block; and pins one each side of the axis rocking on a transverse axis and interposed between the block and the thrust surfaces, said pins having varying cross dimensions and gear segments; and a thrust bar having racks engaging said gear segments to rock the pins to release and set the clutch.

12. In a friction clutch mechanism, the combination of a shaft; a friction clutch on the shaft; and a friction device for actuating the clutch comprising a thrust block; a head mounted on the shaft and having a thrust surface opposed to the block; a pin rocking on a transverse axis and interposed between the block and the thrust surface, said pin having varying cross dimensions, the block assuming a position to set the clutch with a larger cross dimension of the pin interposed between the block and the surface and in position to release the clutch with a smaller dimension of the pin interposed between the block and the surface; and means operating on the pin to force the block through the rocking of the pin to set position, said means being carried by the shaft and having its thrust sustained directly by said shaft.

13. In a friction clutch mechanism, the combination of a shaft; a clutch on the shaft; and a friction device for actuating the clutch comprising a thrust block; a head having a thrust surface opposed to the block; a pin rocking on a transverse axis and interposed between the block and the thrust surface having varying cross dimensions, the block assuming a position to set the clutch with a large cross dimension of the pin interposed between the block and the surface and a position to release the clutch with a smaller dimension of the pin interposed between the block and the surface; a thrust device operating on the pin to rock the same to set and release the clutch; a fixed screw member locked against rotation; and an active screw member acting on the fixed screw member for operating said device.

14. In a friction clutch mechanism, the combination of a shaft; a clutch on the shaft; and a friction device for actuating the clutch comprising a thrust block; a head having a thrust surface opposed to the block; a pin rocking on a transverse axis and interposed between the block and the thrust surface having varying cross dimensions, the block assuming a position to set the clutch with a large cross dimension of the pin interposed between the block and the surface and a position to release the clutch with a smaller dimension of the pin interposed between the block and the surface; a thrust device operating on the pin to rock the same to set and release the clutch; a fixed screw member carried by the head and locked against rotation; and an active screw member acting on the fixed screw member for operating said device.

15. In a friction clutch mechanism, the combination of a shaft; a clutch on the shaft; and a friction device for actuating the clutch comprising a head having an axial bore and two transverse bores; thrust mechanism arranged in the axial bore; and thrust pins having varying cross dimensions mounted in the transverse bores, said pins being a part of the thrust connection between the thrust mechanism and the clutch.

16. In a friction clutch mechanism, the combination of a shaft; a clutch on the shaft; and a friction device comprising a head having an axial bore, the inner part of the bore being of larger dimension than the outer part; a fixed screw member having a head in the larger bore and extending through the smaller bore; an active screw member in the fixed screw member; a rack actuated by the active screw member having a cylindrical guiding surface on the edge operating in connection with the larger axial bore; transverse bores at each side of the axis of the head; rocking pins arranged in said transverse bores, said pins having varying cross dimensions having gear segments thereon adapted to be operated by said rack; and means actuated by the pins for actuating the clutch.

17. In a friction clutch mechanism, the combination of a shaft; a clutch on the shaft; and a friction device for actuating the clutch comprising a thrust block; a head having a thrust surface opposed to the block; a pin rocking on a transverse axis and interposed between the block and the thrust surface, said pin having varying cross dimensions, the block assuming a position to set the clutch with a larger cross dimension of the pin interposed between the block and the surface and in position to release the clutch with a smaller dimension of the pin interposed between the block and the surface; means operating on the pin to force the block through the rocking of the pin to set position; and means for adjusting the relative distance between the block and the surface.

18. In a friction clutch mechanism, the combination of a shaft; a clutch on the shaft; and a friction device for actuating the clutch comprising a thrust block; a head having a thrust surface opposed to the block; a pin rocking on a transverse axis and interposed between the block and the thrust surface, said pin having varying cross dimensions, the block assuming a position to set the clutch with a larger cross dimension of the pin interposed between the block and the surface and in position to release the clutch with a smaller dimension of the pin interposed between the block and the surface; means operating on the pin to force the block through the rocking of the pin to set position; and means for adjusting the head relatively to the shaft for adjusting the relative distance between the surface and the block.

19. In a friction clutch mechanism, the combination of a shaft; a clutch on the shaft; and a friction device for actuating the clutch comprising a thrust block; a head having a thrust surface opposed to the block; a pin rocking on a transverse axis and interposed between the block and the thrust surface, said pin having varying cross dimensions, the block assuming a position to set the clutch with a larger cross dimension of the pin interposed between the block and the surface said pin having varying cross dimensions, the block assuming a position to set the clutch with a larger cross dimension of the pin interposed between the block and the surface and in position to release the clutch with a smaller dimension of the pin interposed between the block and the surface; means operating on the pin to force the block through the rocking of the pin to set position; and a screw threaded connection between the shaft and the head for adjusting the distance between the surface and the block.

20. In a friction clutch mechanism, the combination of a shaft; a clutch on the shaft; and a friction device for actuating the clutch comprising a thrust block; a head having a longitudinal cylindrical bore and a transverse cylindrical bore; a cylindrical pin having one side cut away to vary the cross dimension of the pin, said pin being arranged in said cross bore and being opposed to the block; and means mounted in the longitudinal cylindrical bore for throwing the cut-away portion into and out of register with the block.

21. In a friction clutch mechanism, the combination of a shaft; a clutch on the shaft; and a friction device for actuating the clutch comprising a thrust block; a head having a longitudinal cylindrical bore and two transverse bores, one at each side of the axis of the longitudinal bore; cylindrical pins each having one side cut away to vary the cross dimension of the pins, said pins arranged in said cross bores and adapted to lock the block in set position when the largest dimension is brought into engagement with the block; and means mounted in the longitudinal bore for throwing the cut-away portions into and out of register with the block.

22. In a friction clutch mechanism, the combination of a shaft; a clutch on the shaft; and a friction device for actuating the clutch comprising a thrust block; a head having a transverse bore and a longitudinal bore; means mounted in the transverse bore for locking the block in set position; and means mounted in the longitudinal bore for actuating the clutch.

23. In a friction clutch mechanism, the combination of a shaft; a clutch on the shaft; and a friction device for actuating the clutch comprising a thrust block; a head having a longitudinal cylindrical bore, said longitudinal bore being of varying diameter with a smaller diameter at its outer end than at an intermediate portion, said head also being provided with a transverse bore; a pin arranged in the transverse bore and adapted to lock the block in set position; a thrust nut arranged in the longitudinal bore and operating against the shoulder formed by the difference in diameter of the longitudinal bore; a screw in the nut; and means actuated by the screw for actuating the block and clutch.

In testimony whereof we have hereunto set our hands in the presence of two subscribing witnesses.

BERT C. BALL.
LEWIS E. YOUNIE.

Witnesses:
 HOMER V. CARPENTER,
 J. F. BRUENING.

Copies of this patent may be obtained for five cents each, by addressing the "Commissioner of Patents, Washington, D. C."